US009386329B2

(12) United States Patent
Koyama et al.

(10) Patent No.: US 9,386,329 B2
(45) Date of Patent: Jul. 5, 2016

(54) BROADCAST PROGRAM PROCESSING DEVICE, BROADCAST PROGRAM PROCESSING METHOD, BROADCASTING STATION DEVICE, INFORMATION DISTRIBUTION SERVER, PROGRAM, AND INFORMATION STORAGE MEDIA

(71) Applicant: Sony Computer Entertainment Inc., Tokyo (JP)

(72) Inventors: Nobutoshi Koyama, Kanagawa (JP); Hisashi Tomita, Tokyo (JP)

(73) Assignees: Sony Corporation, Tokyo (JP); Sony Interactive Entertainment Inc., Tokyo (JP)

( * ) Notice: Subject to any disclaimer, the term of this patent is extended or adjusted under 35 U.S.C. 154(b) by 0 days.

(21) Appl. No.: 14/362,245

(22) PCT Filed: Oct. 4, 2012

(86) PCT No.: PCT/JP2012/075853
§ 371 (c)(1),
(2) Date: Jun. 2, 2014

(87) PCT Pub. No.: WO2013/088822
PCT Pub. Date: Jun. 20, 2013

(65) Prior Publication Data
US 2014/0298381 A1   Oct. 2, 2014

(30) Foreign Application Priority Data

Dec. 16, 2011   (JP) .................................. 2011-275652

(51) Int. Cl.
*H04N 7/10*  (2006.01)
*H04N 21/234*  (2011.01)
(Continued)

(52) U.S. Cl.
CPC ........ *H04N 21/23424* (2013.01); *G11B 27/036* (2013.01); *H04N 5/76* (2013.01);
(Continued)

(58) Field of Classification Search
CPC combination set(s) only.
See application file for complete search history.

(56) References Cited

U.S. PATENT DOCUMENTS 8,127,325 B2   2/2012  Rowe
9,055,274 B2 *  6/2015  Casagrande .......... G11B 27/105
(Continued)

FOREIGN PATENT DOCUMENTS

JP   2002157516 A   5/2002
JP   2002165176 A   6/2002
(Continued)

OTHER PUBLICATIONS

International ASearch Report for corresponding PCT Application No. PCT/2012/075853, dated Dec. 18, 2012.
(Continued)

*Primary Examiner* — Chenea Smith
(74) *Attorney, Agent, or Firm* — Matthew B. Dernier, Esq.

(57) ABSTRACT

A broadcast program processing device includes video content recording unit. The video content recording unit causes a storage unit to store a plurality of pieces of video content each of which includes at least one advertisement video. The broadcast program processing device changes the advertisement video included in a piece of video content stored in the storage unit to a substitute advertisement video before being instructed to play any one of the pieces of video content and plays the piece of video content whose advertisement video has been changed if instructed to play any one of the pieces of video content.

13 Claims, 7 Drawing Sheets

(51) Int. Cl.
H04N 21/433 (2011.01)
H04N 21/44 (2011.01)
H04N 21/81 (2011.01)
G11B 27/036 (2006.01)
H04N 5/76 (2006.01)
H04N 21/266 (2011.01)
H04N 21/458 (2011.01)
G11B 20/10 (2006.01)

(52) U.S. Cl.
CPC ........ *H04N 21/266* (2013.01); *H04N 21/4331* (2013.01); *H04N 21/4334* (2013.01); *H04N 21/44016* (2013.01); *H04N 21/458* (2013.01); *H04N 21/812* (2013.01); *G11B 2020/10537* (2013.01)

(56) References Cited

U.S. PATENT DOCUMENTS

| | | | |
|---|---|---|---|
| 2002/0062250 A1 | 5/2002 | Nagano | |
| 2003/0066078 A1* | 4/2003 | Bjorgan et al. | 725/34 |
| 2008/0090513 A1* | 4/2008 | Collins et al. | 455/3.01 |
| 2008/0250447 A1 | 10/2008 | Rowe | |
| 2009/0320060 A1* | 12/2009 | Barrett | 725/32 |
| 2010/0303447 A1* | 12/2010 | Niemeijer et al. | 386/250 |
| 2012/0117584 A1* | 5/2012 | Gordon | H04N 21/254 725/19 |

FOREIGN PATENT DOCUMENTS

| | | |
|---|---|---|
| JP | 2009152810 A | 7/2009 |
| JP | 2009152870 A | 7/2009 |
| JP | 2010011211 A | 1/2010 |
| JP | 4419324 A | 2/2010 |
| JP | 2010524349 A | 7/2010 |
| JP | 2010283782 A | 12/2010 |

OTHER PUBLICATIONS

International Preliminary Report on Patentability for corresponding PCT Application No. PCT/2012/075853, dated Jul. 17, 2014.

Office Action for corresponding JP Application No. 2013-549148, dated May 19, 2015.

* cited by examiner

TIME

FIG.7

| CM CODE | EXPIRY DATE |
|---|---|
| 1000123456 | 2012/1/31 |
| 1000234567 | 2012/2/11 |

| SELECTION METADATA |
| --- |
| ADVERTISEMENT VIDEO DATA 1 |
| ADVERTISEMENT VIDEO DATA 2 |
| ADVERTISEMENT VIDEO DATA 3 |

| PLAYING CONDITION | ADVERTISEMENT VIDEO TO BE PLAYED |
| --- | --- |
| TIME ZONE: 6:00-17:59 | ADVERTISEMENT VIDEO 1 |
| TIME ZONE: 18:00-21:59 | ADVERTISEMENT VIDEO 2 |
| TIME ZONE: 22:00- 5:59 | ADVERTISEMENT VIDEO 3 |

BROADCAST PROGRAM PROCESSING DEVICE, BROADCAST PROGRAM PROCESSING METHOD, BROADCASTING STATION DEVICE, INFORMATION DISTRIBUTION SERVER, PROGRAM, AND INFORMATION STORAGE MEDIA

TECHNICAL FIELD

The present invention relates to a broadcast program processing device, broadcast program processing method, broadcasting station device, information distribution server, program, and information storage media and, more particularly, to a technology for processing video content including an advertisement video.

BACKGROUND ART

Today, many users record video content of broadcast programs from television broadcasting to their recorders and play and view the video content at their convenient times. In general, advertisement videos are often inserted at given times in video content of broadcast programs.

Although being played, an advertisement video inserted in video content may diminish in advertising effect depending on when the video content is played. For example, if the season changes from the time of recording of the video content to the time of playing thereof, an advertisement video for a seasonal product is no longer effective. In order to deal with such a case, a technology is available which replaces a recorded advertisement video with other advertisement video and displays the replaced advertisement video when recorded video content is played. PTL 1 discloses a technology for replacing an advertisement video when recorded video content is played.

CITATION LIST

Present Literature

[PTL 1]
Japanese Patent No. 4419324

SUMMARY

Technical Problem

A process of replacing an advertisement video included in recorded video content with other video is a kind of movie editing process and involves more processing load than the playing process. As a result, the speed of replacing the advertisement video may no longer keep up with the playing speed, causing the video content whose advertisement video has been replaced to be displayed too late. In particular, this phenomenon is likely to occur during fast feeding or rewinding.

The present invention has been devised in light of the foregoing, and it is an object of the present invention to provide a technology for eliminating the likelihood that video content whose advertisement video has been replaced may be displayed too late.

Solution to Problem

In order to solve the above problem, a broadcast program processing device according to the present invention includes video content recording means, video change means, and playing means. The video content recording means causes storage means to store a plurality of pieces of video content each of which includes at least one advertisement video. The video change means changes the advertisement video included in a piece of video content stored in the storage means to a substitute advertisement video before being instructed to play any one of the pieces of video content. The playing means plays the piece of video content whose advertisement video has been changed if instructed to play any one of the pieces of video content.

Further, a broadcast program processing method according to the present invention includes a video content recording step, a video change step, and a playing step. The video content recording step causes storage means to store a plurality of pieces of video content each of which includes at least one advertisement video. The video change step changes the advertisement video included in a piece of video content stored in the storage means to a substitute advertisement video before being instructed to play any one of the pieces of video content. The playing step plays the piece of video content whose advertisement video has been changed if instructed to play any one of the pieces of video content.

Still further, a program according to the present invention causes a computer to function as video content recording means, video change means, and playing means. The video content recording means causes storage means to store a plurality of pieces of video content each of which includes at least one advertisement video. The video change means changes the advertisement video included in a piece of video content stored in the storage means to a substitute advertisement video before being instructed to play any one of the pieces of video content. The playing means plays the piece of video content whose advertisement video has been changed if instructed to play any one of the pieces of video content.

Still further, a computer-readable recording media according to the present invention stores a program that causes a computer to function as video content recording means, video change means, and playing means. The video content recording means causes storage means to store a plurality of pieces of video content each of which includes at least one advertisement video. The video change means changes the advertisement video included in a piece of video content stored in the storage means to a substitute advertisement video before being instructed to play any one of the pieces of video content. The playing means plays the piece of video content whose advertisement video has been changed if instructed to play any one of the pieces of video content.

Still further, a broadcasting station device according to the present invention includes transmission means. The transmission means transmits, to a broadcast program processing device, a substitute advertisement video used to change the advertisement video included in a piece of video content stored in storage means before the broadcast program processing device is instructed to play the piece of video content.

Still further, an information distribution server according to the present invention includes transmission means. The transmission means transmits, to a broadcast program processing device, a substitute advertisement video used to change the advertisement video included in a piece of video content stored in storage means before the broadcast program processing device is instructed to play the piece of video content.

The present invention eliminates the likelihood that video content may be displayed too late if an advertisement video is replaced.

In a mode of the present invention, the video change means may change the advertisement video included in any one of the pieces of video content to a substitute advertisement video according to a preset schedule.

In another mode of the present invention, the video change means may change the advertisement video included in any one of the pieces of video content to the substitute advertisement video if a preset start signal is acquired from a broadcasting signal.

In still another mode of the present invention, the broadcast program processing device further includes substitute management information acquisition means. The substitute management information acquisition means acquires the expiry date of each of the advertisement videos included in the plurality of pieces of video content. The video change means may change the advertisement video included in any one of the pieces of video content to the substitute advertisement video based on the expiry date of each of the advertisement videos.

In still another mode of the present invention, the broadcast program processing device still further includes substitute management information acquisition means. The substitute management information acquisition means acquires association information that associates the substitute advertisement video with an advertisement video to be changed. The video change means may change the advertisement video to be changed included in each of the pieces of video content to the changing advertisement video associated with the advertisement video to be changed.

In still another mode of the present invention, the broadcast program processing device still further includes substitute video acquisition means. The substitute video acquisition means acquires, from a broadcasting signal transmitted from a broadcasting station or from a server connected via a communication line, the substitute advertisement video and a playing condition for playing the substitute advertisement video. The video change means may change one of the advertisement videos included in any one of the pieces of video content to a plurality of substitute advertisement videos appropriate to the playing condition. The playing means may play one of the plurality of substitute advertisement videos to which one of the advertisement videos included in any one of the pieces of video content has been changed based on a circumstance at the time of playing and the playing condition.

In still another mode of the present invention, the playing condition may include a time zone during which to play the substitute advertisement video. The playing means may play one of the plurality of substitute advertisement videos to which one of the advertisement videos included in any one of the pieces of video content has been changed based on a playing time and the playing condition.

In still another mode of the present invention, the transmission means may transmit, to the broadcast program processing device, a start signal adapted to start a process of changing the advertisement video included in the video content to the substitute advertisement video.

BRIEF DESCRIPTION OF DRAWINGS

FIG. 7 is a diagram illustrating an example of expiry date information.

DESCRIPTION OF EMBODIMENTS

Figure 1:
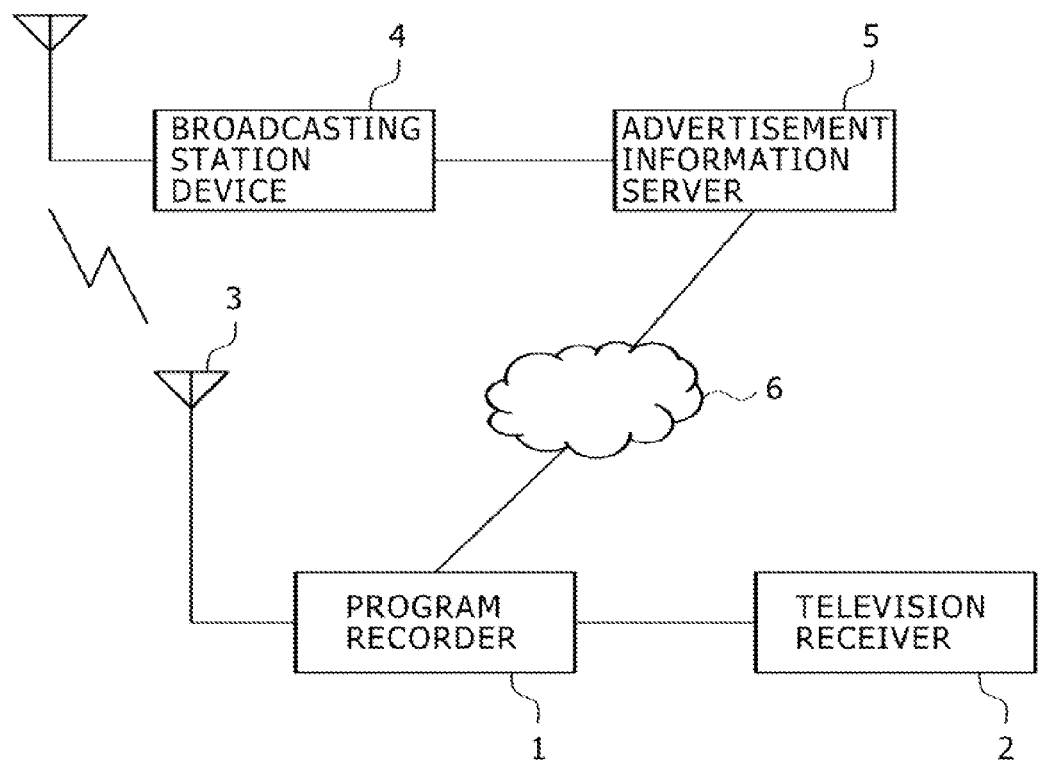
FIG. 1 is a diagram illustrating an example of configuration of a broadcasting system according to an embodiment of the present invention.

A description will be given below of an embodiment of the present invention based on the accompanying drawings. FIG. 1 is a diagram illustrating an example of configuration of a broadcasting system according to an embodiment of the present invention. This broadcasting system includes a program recorder 1, a television receiver 2, a reception antenna 3, a broadcasting station device 4, an advertisement information server 5, and a network 6. The broadcasting station device 4 transmits a broadcasting signal that includes coded video content of a broadcast program including advertisement videos or a broadcasting signal that includes coded data of data broadcasting. The program recorder 1 receives a broadcasting signal from the broadcasting station device 4 via the reception antenna 3 and records video content thereof. Further, when playing recorded video content, the program recorder 1 displays the video on the television receiver 2. Still further, the advertisement information server 5 distributes, via the network 6, information on advertisement videos and substitute advertisement videos used to replace the advertisement videos in a program being broadcast. The network 6 is, for example, the Internet.

Figure 2:
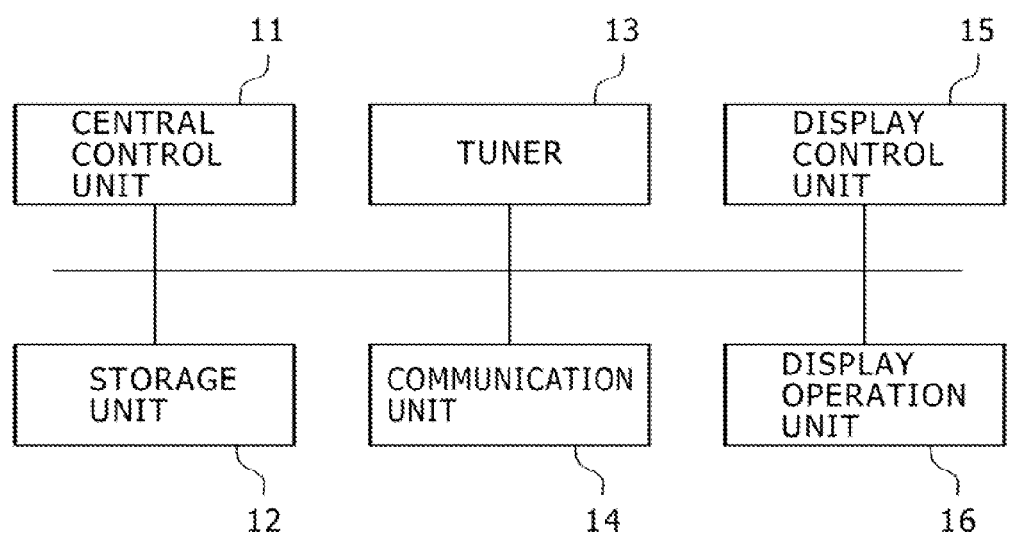
FIG. 2 is a diagram illustrating an example of configuration of a program recorder according to the embodiment of the present invention.

FIG. 2 is a diagram illustrating an example of configuration of the program recorder 1 according to the embodiment of the present invention. The program recorder 1 includes a central control unit 11, a storage unit 12, a tuner 13, a communication unit 14, a display control unit 15, and a display operation unit 16.

The central control unit 11 operates in accordance with a program stored in the storage unit 12 and controls the tuner 13, the communication unit 14, the display control unit 15, and the display operation unit 16. It should be noted that the program may be that stored in the storage unit 12 when the program recorder 1 was manufactured. Alternatively, the program may be that supplied stored on a computer-readable information storage media such as DVD-ROM. Still alternatively, the program may be that supplied via the network 6 such as the Internet.

The storage unit 12 includes memory elements such as RAM and ROM, a hard disk drive, and a media drive for a portable media such as DVD or Blu-ray Disc. The storage unit 12 stores the program. Further, the storage unit 12 stores information and calculation results supplied from various units such as video data of video content of recorded broadcast programs.

The tuner 13 acquires a broadcast signal transmitted using ground waves or satellite waves via the reception antenna 3.

The tuner 13 may receive a broadcast signal via a wired communication network such as cable television network. The tuner 13 decodes the acquired broadcast signal so as to generate video data of video content (movie with sound) of a broadcast program including advertisement videos. The tuner 13 also decodes the broadcast signal so as to generate data broadcasting reception data. In the description given below, we assume that a piece of video content refers to broadcast program content recorded by the user by a single pre-programmed recording or a single recording operation.

The communication unit 14 includes integrated circuitry, communication terminals and so on making up a wired LAN. The communication unit 14 has a function to communicate not only with other devices but also with the advertisement information server 5 via the network 6. The communication unit 14 supplies information received from other devices to the CPU 11 and the storage unit 12 and transmits information to other devices under control of the CPU 11.

The display control unit 15 converts, under control of the central control unit 11, video data generated by the tuner 13 and video data stored in a hard disk drive included in the storage unit 12 or a portable media and controls the television receiver 2 to display the movie and produce the sound both represented by the video data.

The display operation unit 16 includes a display panel, buttons, circuitry, and so on. The display panel is arranged primarily on the front face of the enclosure of the program recorder 1. The buttons are used to input user operations. The circuitry acquires information from external input means such as remote controller. The display operation unit 16 acquires user operations and details of user instructions and displays the status of the program recorder 1 and other information to the user, for example, via the display panel. The display operation unit 16 does so under control of the central control unit 11.

Figure 3:
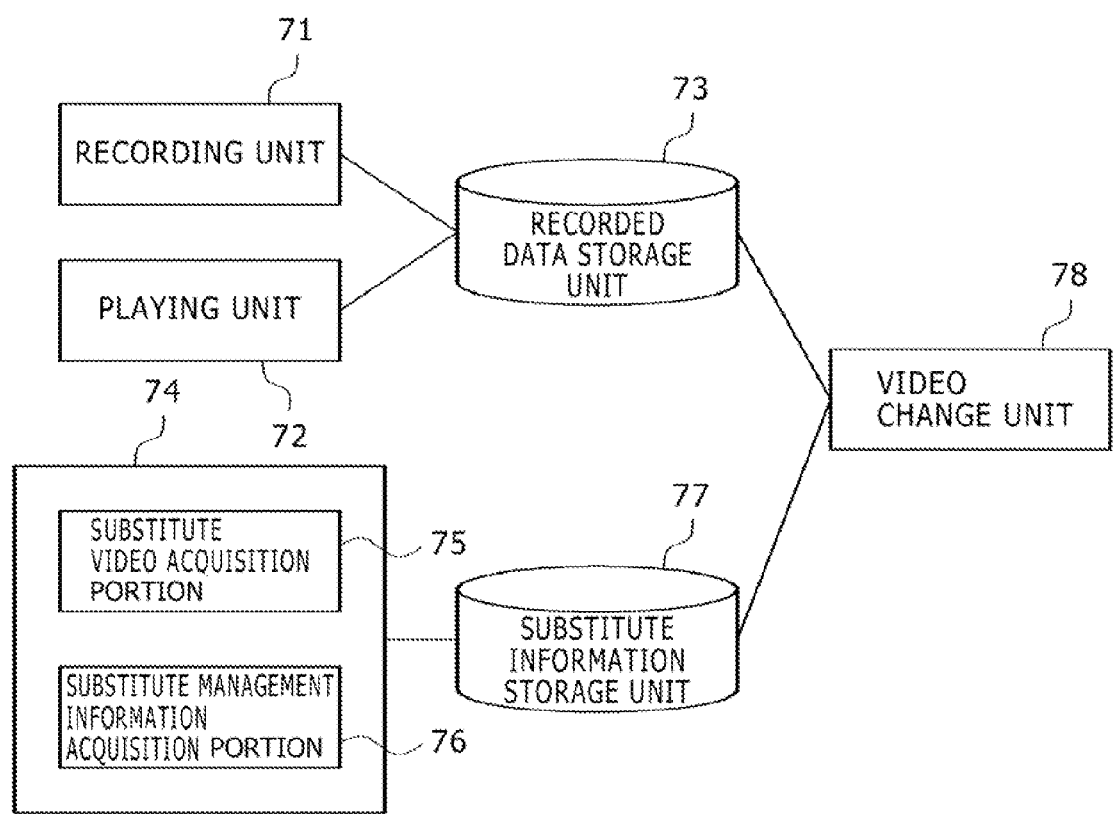
FIG. 3 is a diagram illustrating functional blocks of the program recorder according to the embodiment of the present invention.

FIG. 3 is a diagram illustrating functional blocks of the program recorder 1 according to the embodiment of the present invention. The program recorder 1 functionally includes a recording unit 71, a playing unit 72, a recorded data storage unit 73, a substitute information acquisition unit 74, a substitute information storage unit 77, and a video change unit 78. Also, the substitute information acquisition unit 74 has a substitute video acquisition portion 75 and a substitute management information acquisition portion 76. These functions are implemented by the central control unit 11 executing the program stored in the storage unit 12 and controlling the tuner 13, the communication unit 14, the display control unit 15, and so on.

The recorded data storage unit 73 is primarily implemented, in particular, by the storage device of the storage unit 12 adapted to retain data even if power is removed such as hard disk drive. The recorded data storage unit 73 stores video data representing video content of a broadcast program supplied from the recording unit 71 and video data of video content whose advertisement video has been replaced by the video change unit 78.

The substitute information storage unit 77 is primarily implemented, in particular, by the storage device of the storage unit 12 adapted to retain data even if power is removed. The substitute information storage unit 77 stores expiry date information and association information acquired by the substitute information acquisition unit 74. Expiry date information and association information will be described in detail later.

Also, although not illustrated, the broadcasting station device 4 has a transmission unit adapted to transmit a broadcasting signal to the program recorder 1. Further, the advertisement information server 5 is implemented primarily by a central control unit, a storage unit, and a communication unit and has a transmission unit. The transmission unit transmits information to the program recorder 1 in response to a request from the program recorder 1. The transmission unit included in the advertisement information server 5 may transmit information even when not requested by the program recorder 1. For example, the transmission unit may transmit information to the program recorder 1 at given time intervals.

Figure 4:
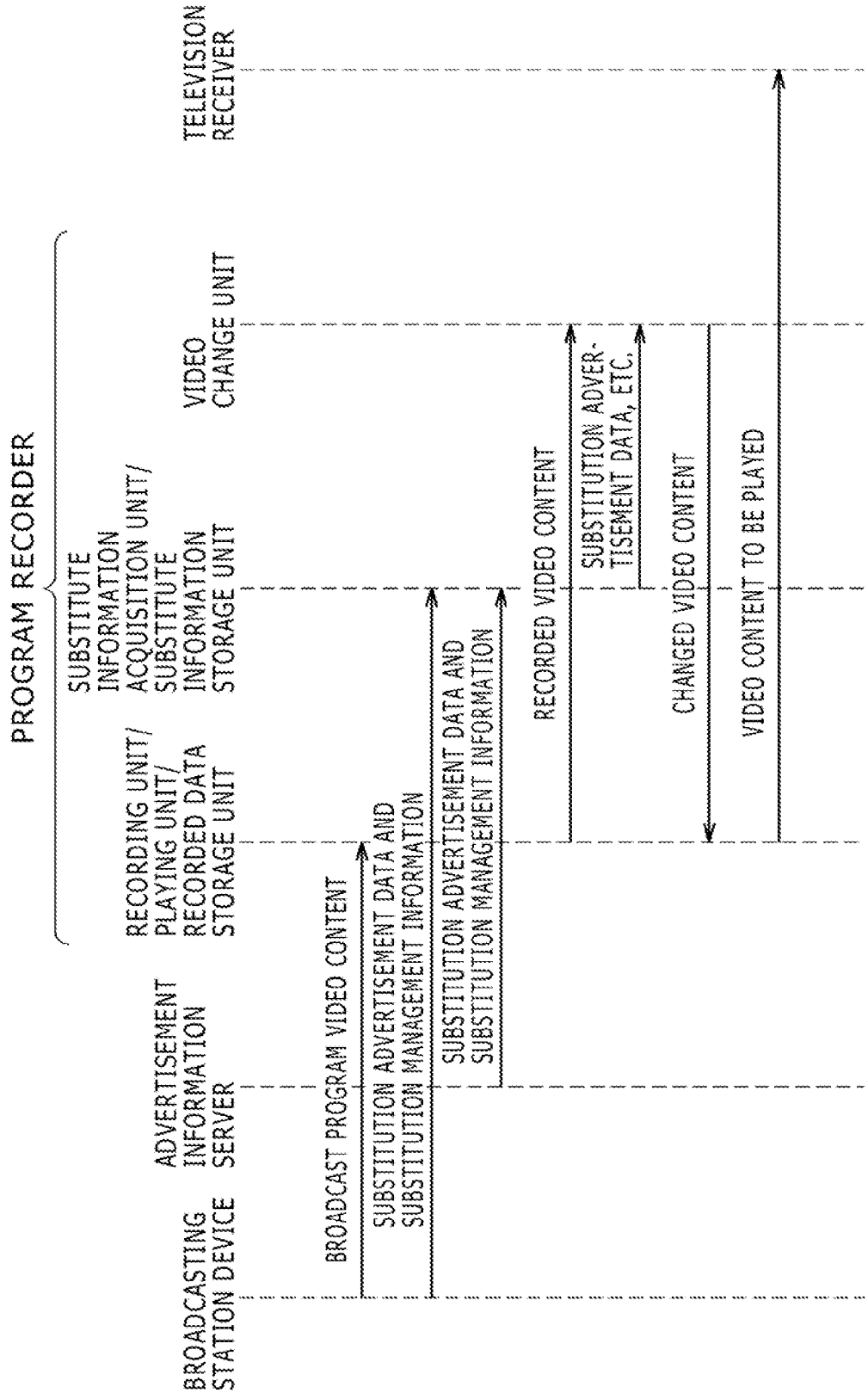
FIG. 4 is a sequence chart outlining an example of operation of the broadcasting system according to the embodiment of the present invention.

FIG. 4 is a sequence chart outlining an example of operation of the broadcasting system according to the embodiment of the present invention. A description will be given below of not only the outline of operation of the broadcasting system but also the operation of each function. In the description, we assume that a video includes a movie and sound.

Figure 5:
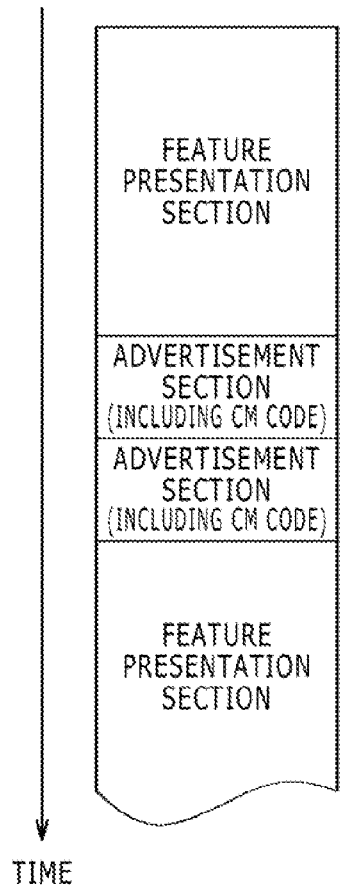
FIG. 5 is a diagram describing an example of video data that represents broadcast program video content.

First, the broadcasting station device 4 transmits a broadcasting signal to the program recorder 1. The broadcasting signal includes coded video data of broadcast program video content. FIG. 5 is a diagram describing an example of video data that represents broadcast program video content. Broadcast program video content includes a plurality of feature presentation sections and a plurality of advertisement sections of the broadcast program arranged side by side in chronological order. An advertisement section corresponds to a kind of advertisement video (corresponds to a video adapted to advertise a product or service and will be hereinafter denoted as advertisement video). In the description given below, video data corresponding to the video of each of the feature presentation sections will be denoted as feature presentation video data, and video data corresponding to the video of an advertisement section will be denoted as advertisement video data. A CM code is also embedded in advertisement video data. A CM code is made up of a four-digit advertising operator code and a six-digit material code and permits unique identification of broadcast advertisement video. It should be noted that the boundaries between the feature presentation sections and the advertisement sections in video data indicating broadcast program video content may be indirectly indicated by the presence or absence of embedded CM code or by the change in sound, brightness and so on.

The recording unit 71 is implemented primarily by the central control unit 11. The recording unit 71 acquires video data generated by the tuner 13 based on the broadcasting signal transmitted by the broadcasting station device 4, compresses the video data by a preset technique, and stores the compressed video data in the recorded data storage unit 73. The recording unit 71 physically causes the storage unit 12 to store the video data.

Next, the broadcasting station device 4 transmits substitute advertisement data and substitute management information. Substitute advertisement data includes advertisement video data that causes a substitute advertisement video to be output. The substitute advertisement video is used to replace an advertisement video included in broadcast program video content. Substitute management information is information about an advertisement video which is changed to (replaced with) the substitute advertisement video. The broadcasting station device 4 may transmit substitute advertisement data and substitute management information in parallel with a broadcast program by using, for example, a data broadcasting area of the television broadcasting signal. Alternatively, the broadcasting station device 4 may upload these pieces of information to the advertisement information server 5 and cause the advertisement information server 5 to distribute these pieces of information. Still alternatively, substitute advertisement data and substitute management information may be transmitted at different times. It should be noted that substitute advertisement data may be transmitted earlier than a broadcast program. The reason for this is that, for example, if the expiry date of a substitute advertisement video is later than that of the advertisement video included in a broadcast program which is broadcast, the advertisement video of the broadcast program can be replaced with the substitute advertisement video which is transmitted earlier.

The substitute video acquisition portion 75 is primarily implemented by the central control unit 11. The substitute video acquisition portion 75 acquires, via the tuner 13, substitute advertisement data transmitted from the broadcasting station device 4 and stores the substitute advertisement data in the substitute information storage unit 77. The substitute video acquisition portion 75 physically causes the storage unit 12 to store the acquired substitute advertisement data.

Figure 6:
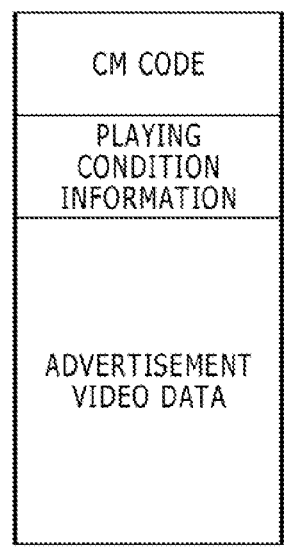
FIG. 6 is a diagram illustrating an example of configuration of substitute advertisement data associated with an advertisement.

FIG. 6 is a diagram illustrating an example of configuration of substitute advertisement data associated with an advertisement. Substitute advertisement data includes a CM code, playing condition information, and advertisement video data that causes substitute advertisement video (movie with sound) to be output. CM code is the same as that included in broadcast program video content. Playing condition information is information representing the condition for playing a substitute advertisement video. A time zone during which to play video content will be shown below as an example of a playing condition. However, other playing conditions may be used including age bracket and sex of the user who performed the playing operation.

The substitute management information acquisition portion 76 is implemented primarily by the central control unit 11. The substitute management information acquisition portion 76 acquires, via the tuner 13, substitute management information transmitted from the broadcasting station device 4 and stores the substitute management data in the substitute information storage unit 77. The substitute management information acquisition portion 76 physically causes the storage unit 12 to store the acquired substitute management information. Substitute management information includes expiry date information and association information. Expiry date information represents the expiry date of an advertisement video included in broadcast program video content. Association information associates a substitute advertisement video to be transmitted with an advertisement video to be changed which is replaced with the substitute advertisement video.

FIG. 7 is a diagram illustrating an example of expiry date information. Expiry date information includes the CM code of an advertisement video distributed as included in broadcast program video content and the expiry date of the advertisement video. Using expiry date information allows to find the expiry date of the advertisement video stored in the recorded data storage unit 73 as part of video content. Association information may take into consideration a playing condition. Alternatively, association information may, for example, associate a single advertisement video to be changed with a plurality of substitute advertisement videos whose playing conditions do not overlap. Here, the substitute information acquisition unit 74 may acquire a substitute advertisement video or substitute management information via the network 6. For example, the substitute video acquisition portion 75 may acquire a substitute advertisement video from the advertisement information server 5, and the substitute management information acquisition portion 76 may acquire substitute management information from the advertisement information server 5.

Next, the video change unit 78 changes the advertisement video included in any one of pieces of video content stored in the substitute information storage unit 77 to a substitute advertisement video before being instructed to play any one of the pieces of video content. In other words, an advertisement video of video content is replaced with some kind of trigger other than a playing instruction before a playing instruction is received. As a more specific example, an advertisement video included in at least part of recorded video content stored in the recorded data storage unit 73 is changed to a substitute advertisement video stored in the substitute information storage unit 77 according to a preset schedule. Here, the video content whose advertisement video has been replaced is stored in the recorded data storage unit 73.

Figure 8:
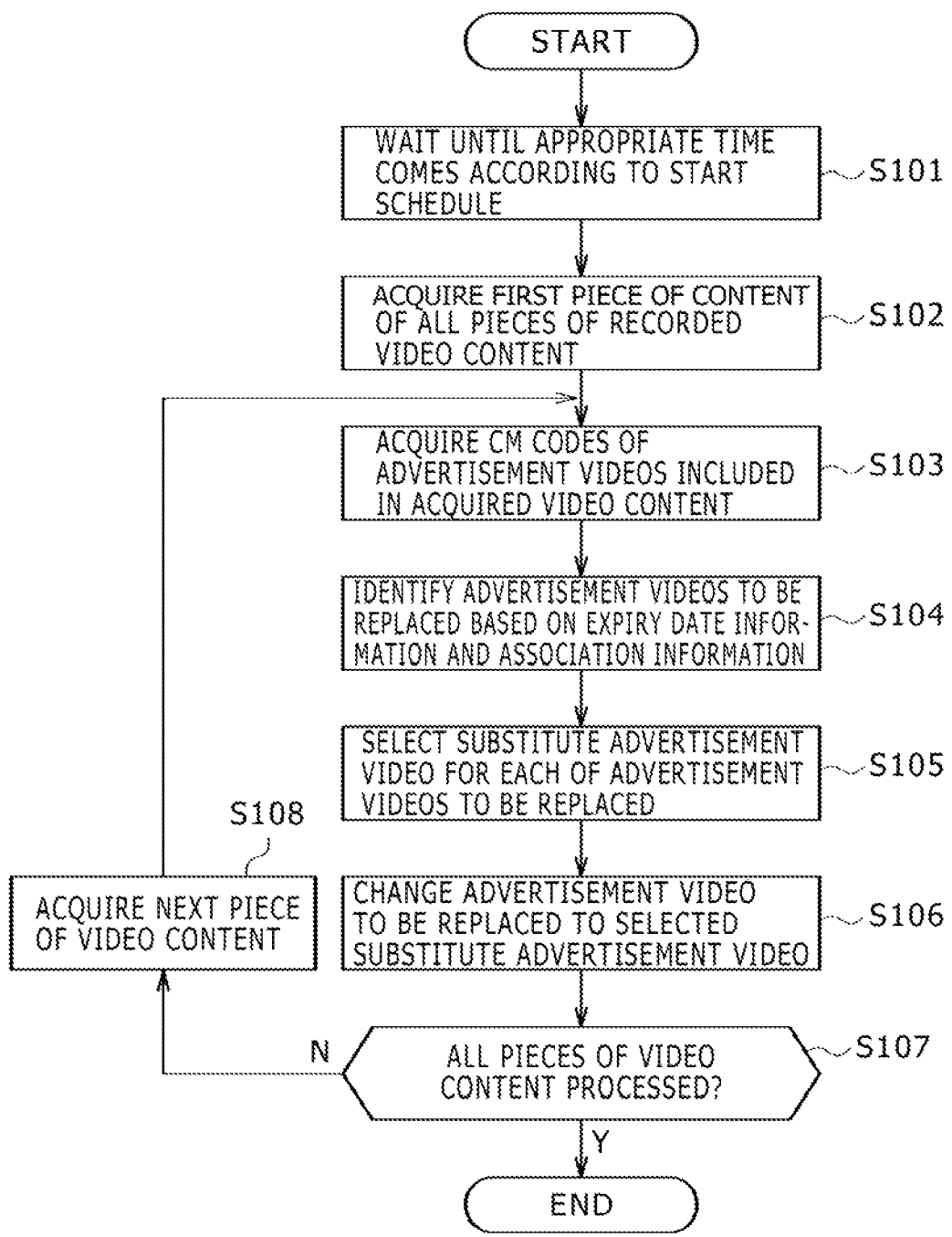
FIG. 8 is a diagram illustrating an example of processing flow of a video change unit.

FIG. 8 is a diagram illustrating an example of processing flow of the video change unit 78. First, the video change unit 78 waits until an appropriate time comes according to a start schedule (step S101). Here, the start schedule may, for example, start the process from a fixed time every day or from a given time on a specific day of the week. Alternatively, the start schedule may start the process at a relative time with respect to other action such as in a given period of time after the power is turned off.

The video change unit 78 proceeds to the process in step S102 when the appropriate time comes according to the start schedule. In step S102, the video change unit 78 acquires the video data of the first piece of video content of all the pieces of recorded video content. Next, the video change unit 78 acquires CM codes from the acquired video data of the video content (step S103). Each of the CM codes identifies one of a plurality of advertisement videos. The video change unit 78 identifies the advertisement video to be replaced based on the acquired CM codes, expiry date information, and association information (step S104). More specifically, the video change unit 78 identifies the CM code and the start time of the advertisement video by each of the two processes described below. The first process is to acquire the expiry date of each of the advertisement videos from the acquired CM codes and expiry date information so as to identify the advertisement video whose expiry date is overdue. The second process is to identify the advertisement videos to be changed in the association information from the acquired CM codes and association information.

Next, the video change unit 78 selects a substitute advertisement video (more specifically, CM code of a substitute advertisement video) for each of the advertisement videos to be replaced (step S105). In the case of an advertisement video to be replaced which has been identified based on the association information, the video change unit 78 selects the CM code of the substitute advertisement video associated by the association information. In the case of an advertisement video to be replaced which has been identified based on the expiry date information, a substitute advertisement video is selected based on the relevance with the advertisement video to be replaced. For example, a substitute advertisement video is selected based on the relationship between the company advertised by the advertisement video to be replaced (hereinafter referred to as the source company) and the company advertised by the substitute advertisement video (hereinafter referred to as the destination company). A substitute advertisement video may be selected so that the destination company is the same as the source company. Alternatively, a substitute advertisement video may be selected so that the destination company is not a competitor of the source company. More specifically, the video change unit 78 selects a substitute advertisement video based on advertising company information and blacklist information. Advertising company information associates CM codes and companies. Blacklist information associates advertisement videos to be replaced and advertisement videos whose replacement is rejected. It should be noted that advertising company information and blacklist information is acquired by the substitute management information acquisition portion 76 in advance.

Next, the video change unit 78 changes the advertisement video to be replaced to the substitute advertisement video selected therefor (step S106). The process of changing an advertisement video to be replaced to a substitute advertisement video includes, for example, the following. One is a process of detecting advertisement video data associated with the advertisement video. Another is a process of deleting the detected advertisement video data. Still another is a process of inserting the advertisement video data that causes the substitute advertisement video to be output where the advertisement video data has been deleted.

Figures 9, 10, 11:
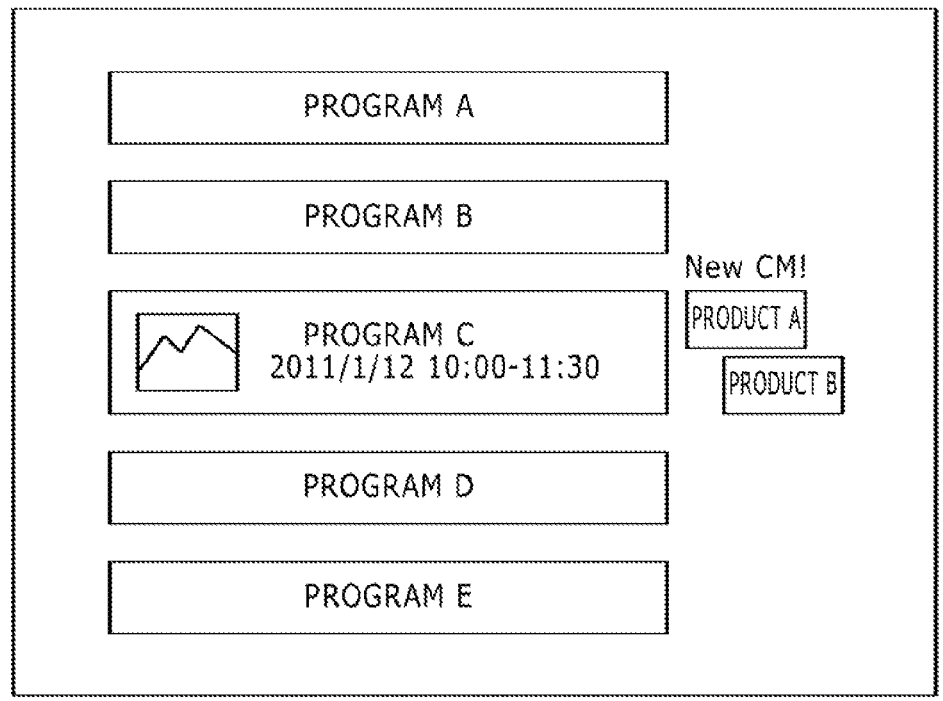
FIG. 9 is a diagram illustrating an example of data configuration that indicates a changed advertisement section.
FIG. 10 is a diagram illustrating an example of selection metadata.
FIG. 11 is a diagram illustrating an example of a playing instruction screen.

At this time, the video change unit 78 may change one of the advertisement videos included in video content to a plurality of substitute advertisement videos appropriate to the playing condition. FIG. 9 is a diagram illustrating an example of data configuration that indicates a changed advertisement section. FIG. 10 is a diagram illustrating an example of selection metadata. In the example illustrated in FIGS. 9 and 10, the advertisement video data corresponding to an advertisement section is changed to selection metadata and three pieces of advertisement video data each of which is associated with an advertisement video. Selection metadata is information that associates a plurality of playing conditions and information adapted to identify advertisement videos appropriate to the playing conditions. Thus, when an advertisement section whose advertisement video data has been changed is played, and if any one of the playing conditions is satisfied, the content of the advertisement video data appropriate to that playing condition is played. For example, playing conditions are specified in such a manner that an advertisement video for adults is played in the midnight time zone, and that an advertisement video for children is played in a time zone such as daytime hours where children are often back from school to watch. This makes it possible to provide advertisements tailored to viewers, thus enhancing advertising effects.

Then, if all the pieces of video content have yet to be subjected to the above processes (N in step S107), the video change unit 78 acquires the next piece of video content (step S108) and repeats the processes from step S103. When all the pieces of video content have already been subjected to the above processes, the video change unit 78 terminates the processes. It should be noted that after the processes are terminated, the video change unit 78 is normally activated again and placed in a wait state in step S101.

Here, the video change unit 78 may wait until a predetermined signal indicating a start is acquired from a broadcasting signal rather than waiting until an appropriate time comes according to a schedule in step S101. The video change unit 78 starts the process of replacing an advertisement video upon acquisition of a signal indicating a start. Substitute advertisement data may be a signal indicating a start. Alternatively, the advertisement information server 5 may transmit predetermined information indicating a start.

The playing unit 72 is implemented primarily by the central control unit 11 and the display control unit 15. If instructed to play any one of the pieces of video content by the user, the playing unit 72 acquires, from the recorded data storage unit 73, the video data that causes the target video content to be output and plays the video content. When playing the video content, the playing unit 72 uses the display control unit 15 to control the television receiver 2 to display the video of the video content and produce the sound thereof. Naturally, the video content to be played may be that whose advertisement video has been changed. Further, if one of the advertisement videos has been changed to a plurality of substitute advertisement videos appropriate to the playing condition, the playing unit 72 acquires information on playing environment such as playing time and selectively plays one of the plurality of advertisement videos to which an advertisement video has been changed in accordance with the playing condition. As a result, the playing unit 72 plays the advertisement video appropriate, for example, to the playing time.

FIG. 11 is a diagram illustrating an example of a playing instruction screen. The playing unit 72 causes the television receiver 2 to output the playing instruction screen, causes the user to select one of a plurality of pieces of video content appearing on the playing instruction screen, and receives the selection as a playing instruction. The playing unit 72 acquires the user operation indicating the playing instruction via the display operation unit 16. Here, if the advertisement video of the piece of video content has been changed by the video change unit 78, the playing unit 72 displays, on the playing instruction screen, an image to that effect. In the example illustrated in FIG. 11, icons appear to the right of the row indicating those pieces of video content. These icons represent the products introduced by the replaced advertisement videos.

It should be noted that the playing unit 72 may transmit, for example, to the advertisement information server 5, a viewing report regarding which advertisement video was played. This allows sponsors to understand how often the advertisements were watched, thus making it possible to measure the effects regarding playing other than real-time viewing of broadcast programs.

The invention claimed is:

1. A broadcast program processing device comprising:
a video data recording unit configured to cause a storage unit to store a plurality of pieces of video data each of which includes at least one piece of advertisement video data and at least one piece of feature presentation video data;
a control unit configured to consider to be determined at least one boundary, between the at least one piece of advertisement video data and the at least one piece of feature presentation video data, based on a presence of a code embedded in the at least one piece of advertisement video data, the control unit configured to consider to be identified at least one of the beginning and end of the at least one piece of advertisement video data in relation to the at least one piece of feature presentation video data;
a video change unit configured to replace, using the considered determined at least one boundary, the at least one piece of advertisement video data included in the video data stored in the storage unit with substitute advertisement video data before being instructed to play any one of the pieces of video data; and
a playing unit configured to play the video data whose advertisement video data has been replaced if instructed to play any one of the pieces of video data;
wherein replacing the at least one piece of advertisement video data with the substitute advertisement video data includes first deleting the at least one piece of advertisement video data included in the video data stored in the storage unit and then inserting the substitute advertisement video data where the at least one piece of advertisement video data has been deleted; and
wherein the playing unit displays, in association with the replacement of the at least one piece of advertisement video data with the substitute video advertisement data, a playing instruction screen that includes both an image indicating that the at least one piece of advertisement video data has been replaced and an icon representing a product introduced by the substitute video advertisement data.

2. The broadcast program processing device of claim 1, wherein the video change unit replaces the at least one piece of advertisement video data included in any one of the pieces of video data with substitute advertisement video data according to a preset schedule.

3. The broadcast program processing device of claim 1, wherein the video change unit replaces the at least one piece of advertisement video data included in any one of the pieces of video data with the substitute advertisement video data if a preset start signal is acquired from a broadcasting signal.

4. The broadcast program processing device of claim 1, further comprising:
a substitute management information acquisition unit configured to acquire the expiry date of each piece of the advertisement video data included in the plurality of pieces of video data,
wherein the video change unit replaces the at least one piece of advertisement video data included in any one of the pieces of video data with the substitute advertisement video data based on the expiry date of each of the pieces of advertisement video data.

5. The broadcast program processing device of claim 1, further comprising:
a substitute management information acquisition unit configured to acquire association information that associates the substitute advertisement video data with advertisement video data to be changed,
wherein the video change unit replaces the at least one piece of advertisement video data to be changed included in each of the pieces of video data with the substitute advertisement video data associated with the at least one piece of advertisement video data to be changed.

6. The broadcast program processing device of claim 1, further comprising:
a substitute video acquisition unit configured to acquire, from a broadcasting signal transmitted from a broadcasting station or from a server connected via a communication line, the substitute advertisement video data and a playing condition for playing the substitute advertisement video data, wherein
the video change unit replaces one of the pieces of advertisement video data included in any one of the pieces of video data with a plurality of pieces of substitute advertisement video data appropriate to the playing condition, and
the playing unit plays one of the plurality of pieces of substitute advertisement video data with which one of the pieces of advertisement video data included in any one of the pieces of video data has been replaced based on a circumstance at the time of playing and the playing condition.

7. The broadcast program processing device of claim 6, wherein:
the playing condition includes a time zone during which to play the substitute advertisement video data, and
the playing unit plays one of the plurality of pieces of substitute advertisement video data with which one of the pieces of advertisement video data included in any one of the pieces of video data has been replaced based on a playing time and the playing condition.

8. A broadcast program processing method comprising:
causing a storage unit to store a plurality of pieces of video data each of which includes at least one piece of advertisement video data and at least one piece of feature presentation video data;
considering to be determined at least one boundary, between the at least one piece of advertisement video data and the at least one piece of feature presentation video data, based on a presence of a code embedded in the at least one piece of advertisement video data;
considering to be identified at least one of the beginning and end of the at least one piece of advertisement video data in relation to the at least one piece of feature presentation video data;
replacing, using the considered determined at least one boundary, the at least one piece of advertisement video data included in the video data stored in the storage unit with substitute advertisement video data before being instructed to play any one of the pieces of video data; and
playing the video data whose advertisement video data has been replaced if instructed to play any one of the pieces of video data;
wherein replacing the at least one piece of advertisement video data with the substitute advertisement video data includes first deleting the at least one piece of advertisement video data included in the video data stored in the storage unit and then inserting the substitute advertisement video data where the at least one piece of advertisement video data has been deleted; and
wherein a playing instruction screen that includes both an image indicating that the at least one piece of advertisement video data has been replaced and an icon representing a product introduced by the substitute video advertisement is displayed in association with the replacement of the at least one piece of advertisement video data with the substitute video advertisement data.

9. A computer having a microprocessor operating under the control of a program causing the computer to function as:
a video data recording unit configured to cause a storage unit to store a plurality of pieces of video data each of which includes at least one piece of advertisement video data and at least one piece of feature presentation video data;
a control unit configured to consider to be determined at least one boundary, between the at least one piece of advertisement video data and the at least one piece of feature presentation video data, based on a presence of a code embedded in the at least one piece of advertisement video data, the control unit configured to consider to be identified at least one of the beginning and end of the at least one piece of advertisement video data in relation to the at least one piece of feature presentation video data;
a video change unit configured to replace, using the considered determined at least one boundary, the at least one piece of advertisement video data included in the video data stored in the storage unit with substitute advertisement video data before being instructed to play any one of the pieces of video data; and
a playing unit configured to play the video data whose advertisement video data has been replaced if instructed to play any one of the pieces of video data;
wherein replacing the at least one piece of advertisement video data with the substitute advertisement video data includes first deleting the at least one piece of advertisement video data included in the video data stored in the storage unit and then inserting the substitute advertisement video data where the at least one piece of advertisement video data has been deleted; and wherein the playing unit displays, in association with the replacement of the at least one piece of advertisement video data with the substitute video advertisement data, a playing instruction screen that includes both an image indicating that the at least one piece of advertisement video data has been replaced and an icon representing a product introduced by the substitute video advertisement data.

10. A non-transitory, computer-readable recording media storing a program, the program causing a computer to function as:
 a video data recording unit configured to cause a storage unit to store a plurality of pieces of video data each of which includes at least one piece of advertisement video data and at least one piece of feature presentation video data;
 a control unit configured to consider to be determined at least one boundary, between the at least one piece of advertisement video data and the at least one piece of feature presentation video data, based on a presence of a code embedded in the at least one piece of advertisement video data, the control unit configured to consider to be identified at least one of the beginning and end of the at least one piece of advertisement video data in relation to the at least one piece of feature presentation video data;
 a video change unit configured to replace, using the considered determined at least one boundary, the at least one piece of advertisement video data included in the video data stored in the storage unit with substitute advertisement video data before being instructed to play any one of the pieces of video data; and
 a playing unit configured to play the video data whose advertisement video data has been replaced if instructed to play any one of the pieces of video data;
 wherein replacing the at least one piece of advertisement video data with the substitute advertisement video data includes first deleting the at least one piece of advertisement video data included in the video data stored in the storage unit and then inserting the substitute advertisement video data where the at least one piece of advertisement video data has been deleted; and
 wherein the playing unit displays, in association with the replacement of the at least one piece of advertisement video data with the substitute video advertisement data, a playing instruction screen that includes both an image indicating that the at least one piece of advertisement video data has been replaced and an icon representing a product introduced by the substitute video advertisement data.

11. A broadcasting station device comprising:
 a control unit configured to consider to be determined at least one boundary, between at least one piece of advertisement video data and at least one piece of feature presentation video data, based on a presence of a code embedded in the at least one piece of advertisement video data, the control unit configured to consider to be identified at least one of a beginning and an end of the at least one piece of advertisement video data in relation to the at least one piece of feature presentation video data; and
 a transmission unit configured to transmit, to a broadcast program processing device, substitute advertisement video data used to replace, using the considered determined at least one boundary, advertisement video data included in video data which is stored in a storage unit and which includes the at least one piece of advertisement video data and the at least one piece of feature presentation video data before the broadcast program processing device is instructed to play the video data;
 wherein replacing the at least one piece of advertisement video data with the substitute advertisement video data includes first deleting the at least one piece of advertisement video data included in the video data stored in the storage unit and then inserting the substitute advertisement video data where the at least one piece of advertisement video data has been deleted; and
 wherein a playing instruction screen that includes both an image indicating that the at least one piece of advertisement video data has been replaced and an icon representing a product introduced by the substitute video advertisement is displayed in association with the replacement of the at least one piece of advertisement video data with the substitute video advertisement data.

12. The broadcasting station device of claim 11, wherein the transmission unit further transmits, to the broadcast program processing device, a start signal adapted to start a process of replacing the at least one piece of advertisement video data included in the video data with the substitute advertisement video data.

13. An information distribution server comprising:
 a control unit configured to consider to be determined at least one boundary, between at least one piece of advertisement video data and at least one piece of feature presentation video data, based on a presence of a code embedded in the at least one piece of advertisement video data, the control unit configured to consider to be identified at least one of a beginning and an end of the at least one piece of advertisement video data in relation to the at least one piece of feature presentation video data; and
 a transmission unit configured to transmit, to a broadcast program processing device, substitute advertisement video data used to replace, using the considered determined at least one boundary, advertisement video data included in video data which is stored in a storage unit and which includes the at least one piece of advertisement video data and the at least one piece of feature presentation video data before the broadcast program processing device is instructed to play the video data;
 wherein replacing the at least one piece of advertisement video data with the substitute advertisement video data includes first deleting the at least one piece of advertisement video data included in the video data stored in the storage unit and then inserting the substitute advertisement video data where the at least one piece of advertisement video data has been deleted; and
 wherein a playing instruction screen that includes both an image indicating that the at least one piece of advertisement video data has been replaced and an icon representing a product introduced by the substitute video advertisement is displayed in association with the replacement of the at least one piece of advertisement video data with the substitute video advertisement data.

* * * * *